United States Patent
Takaaki (10) Patent No.: US 8,593,851 B2
(45) Date of Patent: Nov. 26, 2013

(54) VERIFICATION SYSTEM

(75) Inventor: Fuchikami Takaaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 140 days.

(21) Appl. No.: 13/275,670

(22) Filed: Oct. 18, 2011

(65) Prior Publication Data

US 2012/0092918 A1    Apr. 19, 2012

(30) Foreign Application Priority Data

Oct. 18, 2010 (JP) .................. 2010-234087

(51) Int. Cl.
*G11C 11/22* (2006.01)
(52) U.S. Cl.
USPC ........................................................ 365/145
(58) Field of Classification Search
USPC ........................................................ 365/145
See application file for complete search history.

(56) References Cited

U.S. PATENT DOCUMENTS

2010/0254201 A1* 10/2010 Asauchi ............... 365/189.011
2011/0010493 A1* 1/2011 Kimura et al. ............. 711/103

FOREIGN PATENT DOCUMENTS

JP       2009-272299        11/2009
WO    WO 2009107408 A1 *  9/2009  ............. H03K 19/20

* cited by examiner

*Primary Examiner* — Hoai V Ho
*Assistant Examiner* — Tri Hoang
(74) *Attorney, Agent, or Firm* — Fish & Richardson P.C.

(57) ABSTRACT

A verification system of the present invention is provided to perform unidirectional or bidirectional verification between a master apparatus and a slave apparatus comprising the master apparatus having a master memory capable of storing verification key code in a non-volatile manner and the slave apparatus having a slave memory capable of storing verification key code in the non-volatile manner, wherein at least the slave memory is one of the group consisting of non-volatile logic circuit and ferroelectric an memory, both of which use hysteresis characteristics of ferroelectric components.

10 Claims, 6 Drawing Sheets

VERIFICATION SYSTEM

BACKGROUND OF THE INVENTION

1. Field of the Invention

The present invention relates to a verification system for performing unidirectional or bidirectional verification between a master apparatus (main apparatus) and a slave apparatus (client apparatus).

2. Description of the Related Art

Several verification systems have been realized for performing to unidirectional or bidirectional verification between a master apparatus and a slave apparatus, such as printers and ink cartridges, portable game machines and game boxes, or batteries and battery-powered electronic equipment (handset phone, digital camera, digital video, notebook PC and so on), thereby preventing non-normalized products from being used improperly. Japanese Patent No. 2009-272299 can be considered an example of the prior art described above.

Nevertheless, in the previous verification systems, the non-volatile memory capable of storing verification key code in a non-volatile manner uses flash memory or EEPROM (Electrically Erasable and Programmable Read Only Memory), which can be manufactured without any special equipment or technology, and thus is cheap and easy to copy. Such problems usually appear in non-normalized products with duplicate chips. Furthermore, the verification algorithms used in the previous verification systems do not depend on the characteristics or abilities of the non-volatile memory (such as data writing speed); thus it is cheaper and easier to perform similar operations by using other components. Such problems usually appear in non-normalized products with compatible chips.

In view of the above problems, an object of the present invention is to provide a verification system capable of preventing non-normalized products with duplicate chips or compatible chips from being circulated.

SUMMARY OF THE INVENTION

To achieve the above object, a verification system according to the present invention is provided to perform unidirectional or bidirectional verification between a master apparatus and a slave apparatus, comprising: the master apparatus having a master memory capable of storing verification key code in a non-volatile manner; and the slave apparatus having a slave memory capable of storing verification key code in the non-volatile manner, wherein at least the slave memory is one of the group consisting of non-volatile logic circuit and ferroelectric memory, which in either case relies on the characteristics of hysteresis inherent in ferroelectric components (first configuration).

According to the present invention, it is preferable that in the verification system comprising the first configuration described above, the master apparatus writes a first key code into the master memory and the slave memory while an action is finished and reads data out from the master memory and the slave memory to perform verification while an action is initiated (second configuration).

According to the present invention, it is preferable that in the verification system comprising the second configuration described above, the master apparatus writes a second key code different from the first key code into the slave memory after verifying the first key code, and then reads data out from the slave memory to perform verification immediately (third configuration).

According to the present invention, it is preferable that in the verification system comprising the second configuration described above, the master apparatus writes a second key code different from the first key code into the master memory and the slave memory and turns the slave apparatus off/on after verifying the first key code, and then reads data out from the slave memory to perform verification (fourth configuration).

According to the present invention, it is preferable that in the verification system comprising the third or fourth configuration described above, the master apparatus writes the second key code generated by a function of the first key code into the slave memory, and the slave apparatus verifies whether the second key code being written into the slave memory is the function of the first key code (fifth configuration).

According to the present invention, it is preferable that the verification system comprising any of the first to fifth configurations described above be configured such that the non-volatile logic circuit comprises a loop structure portion keeping data by using a plurality of logic gates that are connected in a loop; a non-volatile storage portion storing data kept by the loop structure portion in a non-volatile manner by means of the hysteresis characteristics of ferroelectric components; and a circuit separation portion electrically separating the loop structure portion and the non-volatile storage portion (sixth configuration).

With the verification system according to the present invention, it is possible to prevent non-normalized products with duplicate chips or compatible chips from being circulated.

Common reference numerals are used throughout the drawings and the detailed description to indicate the same components. The present invention will be more apparent from the following detailed description taken in conjunction with the accompanying drawings.

DETAILED DESCRIPTION OF THE INVENTION

Figure 1:
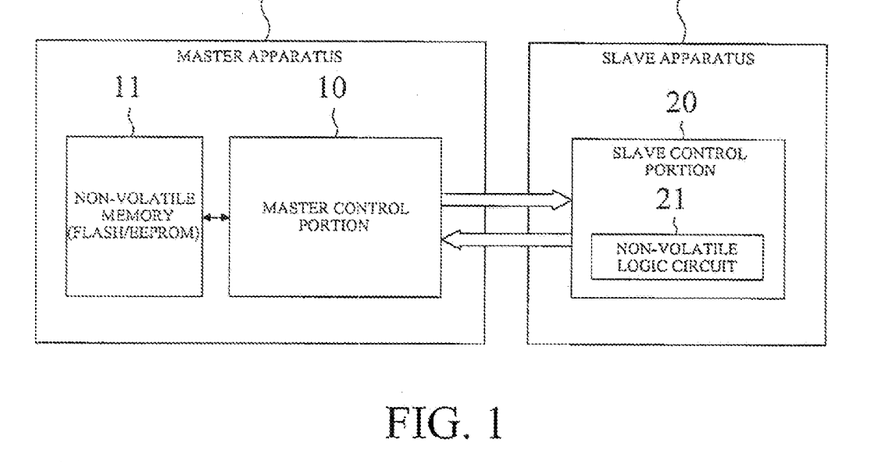
FIG. 1 is a block diagram of a verification system according to an embodiment of the present invention.

FIG. 1 is a block diagram of a verification system according to an embodiment of the present invention. The verification system of this embodiment performs unidirectional or bidirectional verification between a master apparatus 1 and a slave apparatus 2, such as printers and ink cartridges, portable game machines and game boxes, or batteries and battery-powered electronic equipment (handset phone, digital camera, digital video, notebook PC and so on).

The master apparatus 1 as a circuit block with respect to the verification system at least comprises a master control portion 10 and a non-volatile memory 11. The master control portion 10 controls all operations of the master apparatus 1 and performs specific verification with the slave apparatus 2. The non-volatile memory 11 is a master memory capable of storing verification key code in a non-volatile manner, which can use flash memory or EEPROM. The verification algorithm will also be described in detail below.

The slave apparatus 2 as a circuit block with respect to the verification system at least comprises a slave control portion 20. The slave control portion 20 controls all operations of the slave apparatus 2 and performs specific verification with the master apparatus 1. The slave control portion 20 comprises a non-volatile logic circuit 21 using the hysteresis characteristics of ferroelectric components, which is used as a locking circuit or a register. The non-volatile logic circuit 21 is a slave memory capable of storing verification key code in a non-volatile manner.

Figure 2:
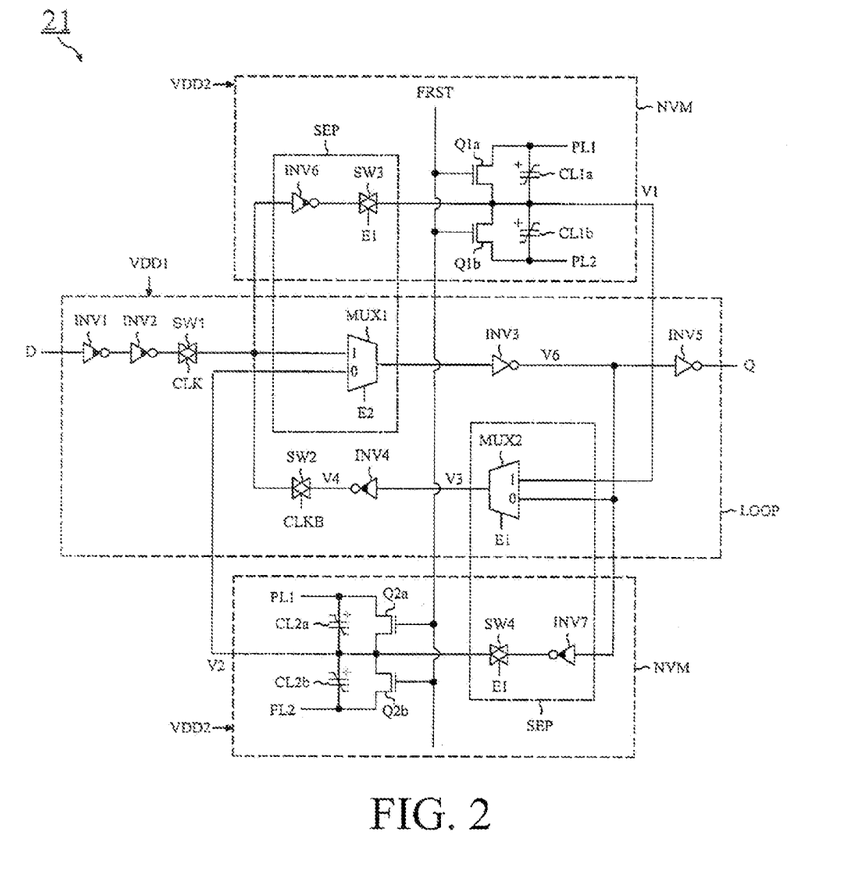
FIG. 2 is a circuit diagram of a non-volatile logic circuit according to an embodiment of the present invention.

FIG. 2 is a circuit diagram of a non-volatile logic circuit 21 according to an embodiment of the present invention. The non-volatile logic circuit 21 of this embodiment comprises inverters INV1 to INV7, path switches SW1 to SW4, multiplexers MUX1 and MUX2, N-channel MOS (Metal Oxide Semiconductor) field effect transistors Q1a, Q1b, Q2a, and Q2b, and ferroelectric components (ferroelectric capacitors) CL1a, CL1b, CL2a, and CL2b.

An input terminal of the inverter INV1 is connected to a supply terminal of a data signal (D). An output terminal of the inverter INV1 is connected to an input terminal of the inverter INV2. An output terminal of the inverter INV2 is connected, via the path switch SW1, to a first input terminal (1) of the multiplexer MUX1. An output terminal of the multiplexer MUX1 is connected to an input terminal of the inverter INV3. An output terminal of the inverter INV3 is connected to an input terminal of the inverter INV5. An output terminal of the inverter INV5 is connected to an extraction terminal of an output signal (Q). A first input terminal of the multiplexer MUX2 is connected to the output terminal of the inverter INV3. An output terminal of the multiplexer MUX2 is connected to an input terminal of the inverter INV4. An output terminal of the inverter INV4 is connected, via the path switch SW2, to the first input terminal (1) of the multiplexer MUX1.

Furthermore, the non-volatile logic circuit 21 of this embodiment comprises a loop structure portion LOOP that keeps an inputted data signal D by using two logic gates (the inverters INV3 and INV4 of FIG. 2) that are connected in a loop. The loop structure portion LOOP is driven by a supply of a first power voltage VDD1 (e.g. 0.6V).

An input terminal of the inverter INV6 is connected to the first input terminal (1) of the multiplexer MUX1. An output terminal of the inverter INV6 is connected, via the path switch SW3, to a second input terminal (0) of the multiplexer MUX2. An input terminal of the inverter INV7 is connected to the first input terminal (1) of the multiplexer MUX2. An output terminal of the inverter INV7 is connected, via the path switch SW4, to a second input terminal (0) of the multiplexer MUX1.

A positive terminal of the ferroelectric component CL1a is connected to a first plate line PL1. A negative terminal of the ferroelectric component CL1a is connected to the second input terminal (0) of the multiplexer MUX2. The two terminals of the ferroelectric component CL1a are connected to the transistor Q1a. A gate of the transistor Q1a is connected to a supply terminal of an F reset signal FRST.

A positive terminal of the ferroelectric component CL1b is connected to the second input terminal (0) of the multiplexer MUX2. A negative terminal of the ferroelectric component CL1b is connected to a second plate line PL2. The two terminals of the ferroelectric component CL1b are connected to the transistor Q1b. A gate of the transistor Q1b is connected to the supply terminal of the F reset signal FRST.

A positive terminal of the ferroelectric component CL2a is connected to the first plate line PL1. A negative terminal of the ferroelectric component CL2a is connected to the second input terminal (0) of the multiplexer MUX1. The two terminals of the ferroelectric component CL2a are connected to the transistor Q2a. A gate of the transistor Q2a is connected to the supply terminal of the F reset signal FRST.

A positive terminal of the ferroelectric component CL2b is connected to the second input terminal (0) of the multiplexer MUX1. A negative terminal of the ferroelectric component CL2b is connected to the second plate line PL2. The two terminals of the ferroelectric component CL2b are connected to the transistor Q2b. A gate of the transistor. Q2b is connected to the supply terminal of the F reset signal FRST.

As described above, the non-volatile logic circuit 21 of this embodiment comprises a non-volatile storage portion NVM that stores the data signal D kept by the loop structure portion LOOP in a non-volatile manner by means of hysteresis characteristics of the ferroelectric components (CL1a, CL1b, CL2a, and CL2b). Also, the non-volatile storage portion NVM is driven by a supply of a second power voltage VDD2 (e.g. 1.2V) higher than the first power voltage VDD1.

Among the components described above, the path switch SW1 is turned on/off according to a logic signal CLK, and the path switch SW2 is turned on/off according to an inverted logic signal CLKB (a logic inverted signal of the logic signal CLK). This means that the path switches SW1 and SW2 are turned on/off exclusively (complementarily) to each other.

On the other hand, the path switches SW3 and SW4 are both turned on/off according to a control signal E1. Signal paths with respect to the multiplexers MUX1 and MUX2 are switched according to a control signal E2. In other words, a circuit separation portion SEP which electrically separates the loop structure portion LOOP and the non-volatile storage portion NVM is composed of the multiplexers MUX1 and MUX2, the inverters INV6 and INV7, and the path switches SW3 and SW4 that are contained in the non-volatile logic circuit 21 of this embodiment.

Among the components forming the circuit separation portion SEP, the multiplexers MUX1 and MUX2 contained in the loop structure portion LOOP are driven by the supply of the first power voltage VDD1, and the path switches SW3 and SW4 contained in the non-volatile storage portion NVM are driven by the supply of the second power voltage VDD2. Furthermore, the inverters INV6 and INV7 are driven by the supplies of both the first power voltage VDD1 and the second power voltage VDD2, which are used as level shifters to change the voltage level of the data signal D switched between the loop structure portion LOOP and the non-volatile storage portion NVM.

Next, a detailed description of an operation of the non-volatile logic circuit 21 will be given. In the descriptions below each node voltage will be denoted by a symbol, e.g., a voltage appearing at a connection node between the ferroelectric components CL1a and CL1b will be denoted by V1, a voltage appearing at a connection node between the ferroelectric components CL2a and CL2b will be denoted by V2, a voltage appearing at the input terminal of the inverter INV4 will be denoted by V3, a voltage appearing at the output terminal of the inverter INV4 will be denoted by V4, a voltage appearing at the input terminal of the inverter INV3 will be denoted by V5, and a voltage appearing at the output terminal of the inverter INV3 will be denoted by V6.

Figure 3:
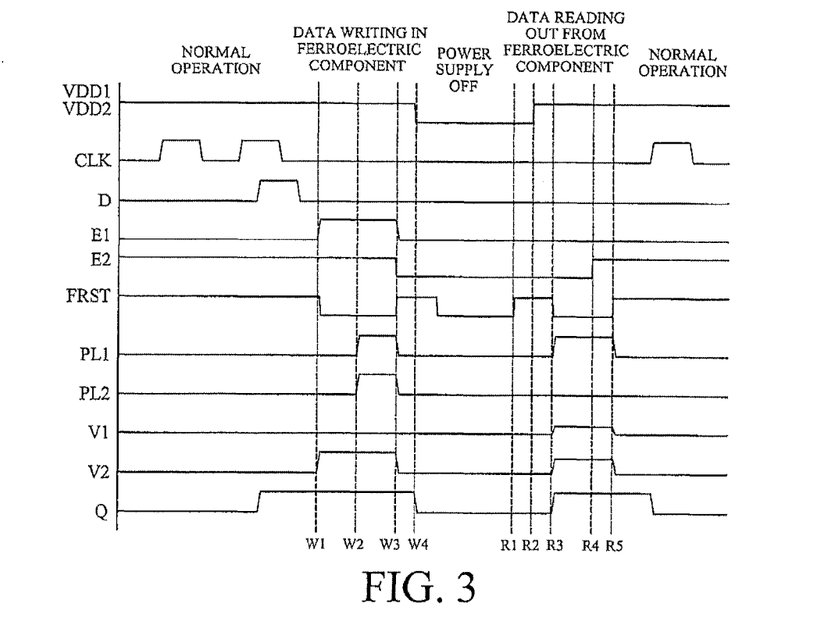
FIG. 3 is a timing chart illustrating an example of an operation of the non-volatile logic circuit.

FIG. 3 is a timing chart for illustrating an example of an operation of the non-volatile logic circuit 21. In the figure are shown voltage waveforms of the power voltages (VDD1, VDD2), the logic signal CLK, the data signal D, the control signal E1, the control signal E2, the F reset signal FRST, a supply voltage of the first plate line PL1, a supply voltage of the second plate line PL2, the node voltage V1, the node voltage V2, and the output signal Q, respectively from top to bottom.

First, a normal operation of the non-volatile logic circuit 21 will be described.

Until time point W1, the F reset signal FRST is set to "1 (high level: VDD2)," the transistors Q1a, Q1b, Q2a, and Q2b are turned on, and two terminals of each of the ferroelectric components CL1a, CL1b, CL2a, and CL2b are short circuited. This means that the ferroelectric components CL1a, CL1b, CL2a and CL2b are in a state of no voltage being applied. Meanwhile the first and second plate lines PL1 and PL2 are set to to "0 (low level: GND)."

Additionally, until time point W1, the control signal E1 is set to "0 (GND)"; meanwhile, the path switches SW3 and SW4 are turned off. Thus the data writing drivers (the inverters INV6 and INV7 of FIG. 2) are disabled.

Moreover, until time point W1, the control signal E2 is set to "1 (VDD)"; meanwhile, the first input terminals (1) of the multiplexers MUX1 and MUX2 are selected. Thus a normal loop is formed in the loop structure portion LOOP.

Accordingly, the path switches SW1 and SW2 are respectively turned on and off during a high-level period of the logic signal CLK. Thus the data signal D passes as it is the output signal Q. On the other hand, the path switches SW1 and SW2 are respectively turned off and on during a low-level period of the logic signal CLK. Thus the data signal D is latched at a falling edge of the logic signal. CLK.

Figure 4:
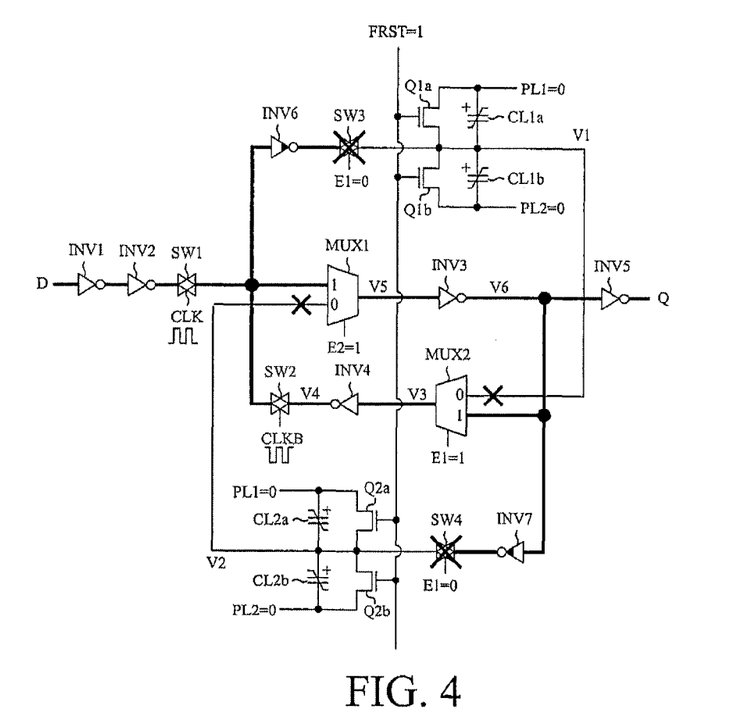
FIG. 4 is a circuit diagram showing a signal path for normal operation.

FIG. 4 is a circuit diagram showing a signal path (described as a heavy line in the figure) for the normal operation.

Next, an operation of writing data into the ferroelectric components will be described.

From time point W1 to time point W3, the logic signal CLK is set to "0 (GND)"; meanwhile, the inverted logic signal CLKB is set to "1 (VDD1)." Thus the first and second path switches SW1 and SW2 are turned off and on, respectively. By fixing the logical values of the logic signal CLK and the inverted logic signal CLKB beforehand, the operating stability of writing data into the ferroelectric components can be improved.

From time point W1 to time point W3, the F reset signal FRST is set to "0 (GND)"; meanwhile, the transistors Q1a, Q1b, Q2a, and Q2b are turned off. This means that the ferroelectric components CL1a, CL1b, CL2a, and CL2b are in a state of a voltage being applied.

From time point W1 to time point W3, the control signal E1 is set to "1 (VDD2)"; meanwhile, the path switches SW3 and SW4 are turned on. Thus the data writing drivers (the inverters INV6 and INV7 of FIG. 2) are enabled.

From time point W1 to time point W3, the control signal E2 is set to "1 (VDD1)" as the setting before time point W1; meanwhile, the first input terminals (1) of the multiplexers MUX1 and MUX2 are selected. Thus a normal loop is formed in the loop structure portion LOOP.

From time point W1 to time point W2, the first and second plate lines PL1 and PL2 are set to "0 (GND)," and then the first and second plate lines PL1 and PL2 are set to "1 (VDD2)" from time point W2 to time point W3, which means that the same pulse voltage is applied to the first and second plate lines PL1 and PL2. By applying the pulse voltage in this way, the states of remanent polarization in the ferroelectric components are capable of being set either to an inversion or a non-inversion state.

Specifically, with reference to the example shown in FIG. 3, at time point W1, the output signal Q is set to "1 (VDD1)," and thus the node voltages V1 and V2 become "0 (GND)" and "1 (VDD2)," respectively. From time point W1 to time point W2, while the first and second plate lines PL1 and PL2 are set to "0 (GND)," the two terminals of each of the ferroelectric components CL1a and CL1b are in a state of no voltage being applied, the two terminals of the ferroelectric component CL2a are in a state of a negative voltage being applied, and the two terminals of the ferroelectric component CL2b are in a state of a positive voltage being applied. On the other hand, from time point W2 to time point W3, while the first and second plate lines PL1 and PL2 are set to "1 (VDD2)," the two terminals of each of the ferroelectric components CL2a and CL2b are in a state of no voltage is applied, the two terminals of the ferroelectric component CL1a are in a state of a positive voltage being applied, and the two terminals of the ferroelectric component CL1b are in a state of a negative voltage being applied.

Accordingly, the states of remanent polarization in the ferroelectric components are capable of being set either to an inversion or a non-inversion state by applying a pulse voltage to the first and second plate lines PL1 and PL2. In addition, the remanent polarization states of the ferroelectric components CL1a and CL1b are contrary to each other and that of the ferroelectric components CL2a and CL2b are also contrary to each other. Simultaneously, the remanent polarization states of the ferroelectric components CL1a and CL2a are contrary to each other and those of the ferroelectric components CL1b and CL2b are also contrary to each other.

At time point W3, the F reset signal FRST is set to "1 (VDD2)" again, the transistors Q1a, Q1b, Q2a, and Q2b are turned on, and the two terminals of each of the ferroelectric components CL1a, CL1b, CL2a, and CL2b are short circuited. This means that the ferroelectric components CL1a, CL2a and CL2b are in a state of no voltage being applied. Meanwhile the first and second plate lines PL1 and PL2 are set to "0 (GND)."

Also, at time point W3, the control signal E1 is set to "0 (GND)" again; meanwhile, the path switches SW3 and SW4 are turned off. Thus the data writing drivers (the inverters INV6 and INV7 of FIG. 2) are disabled. Additionally, the control signal E2, which is not handled here, is set to "0 (GND)" in the example shown in FIG. 3.

At time point W4, the first power voltage VDD1 applying to the loop structure portion LOOP and the second power voltage VDD2 applying to the non-volatile storage portion NVM are shut off. At this time, the F reset signal FRST is maintained at "1 (VDD2)" that is set from time point W3, the transistors Q1a, Q1b, Q2a, and Q2b are turned on, and the two terminals of each of the ferroelectric components CL1a, CL1b, CL2a, and CL2b are short circuited. Since the ferroelectric components CL1a, CL1b, CL2a, and CL2b are in the state of no voltage being applied, no unpremeditated voltage is applied to the ferroelectric components CL1a, CL1b, CL2a, and CL2b even if a voltage variation occurs while turning off the power, thereby preventing data from being damaged.

Figure 5:
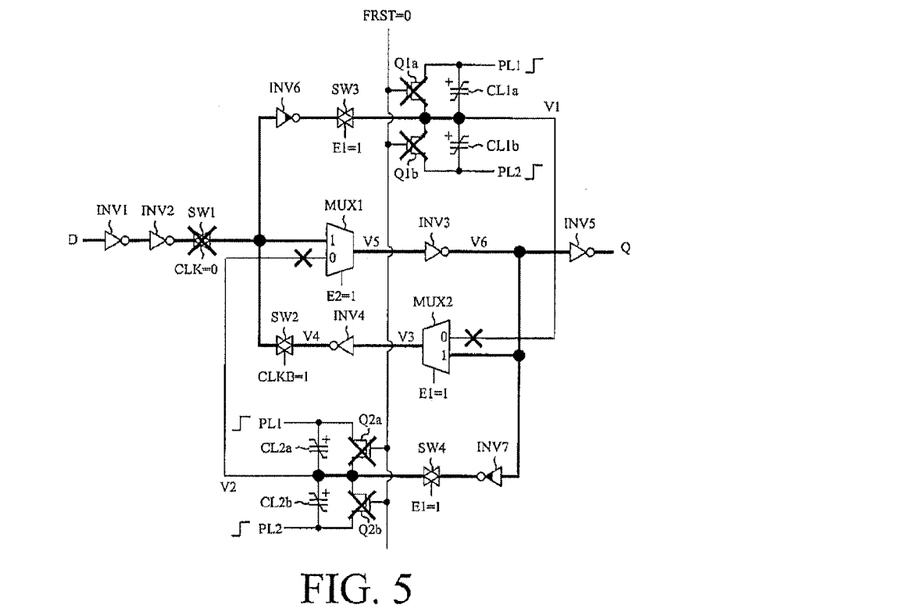
FIG. 5 is a circuit diagram showing a signal path in data writing operation.

FIG. 5 is a circuit diagram showing a signal path (indicated by a heavy line in the figure) in a data writing operation (particularly from time point W1 to time point W3).

Next, an operation of reading data out from the ferroelectric components will be described.

From time point R1 to time point R5, the logic signal CLK is set to "0 (GND)"; meanwhile, the inverted logic signal CLKB is set to "1 (VDD1)." Thus the first and second path switches SW1 and SW2 are turned off and on, respectively. By fixing the logical values of the logic signal CLK and the inverted logic signal CLKB beforehand, the operating stability of reading data out from the ferroelectric components can be improved.

At time point R1, the F reset signal FRST is set to "1 (VDD1)" first, the transistors Q1a, Q1b, Q2a, and Q2b are turned on, and the two terminals of each of the ferroelectric components CL1a, CL1b, CL2a, and CL2b are short circuited. Since the ferroelectric components CL1a, CL1b, CL2a, and CL2b are in the state of no voltage being applied, no unpremeditated voltage is applied to the ferroelectric components CL1a, CL1b, CL2a, and CL2b even if a voltage variation occurs while turning on the power, thereby preventing data from being damaged.

At time point R1, the first and second plate lines PL1 and PL2 are set to "0 (low level: GND)."

Figure 6:
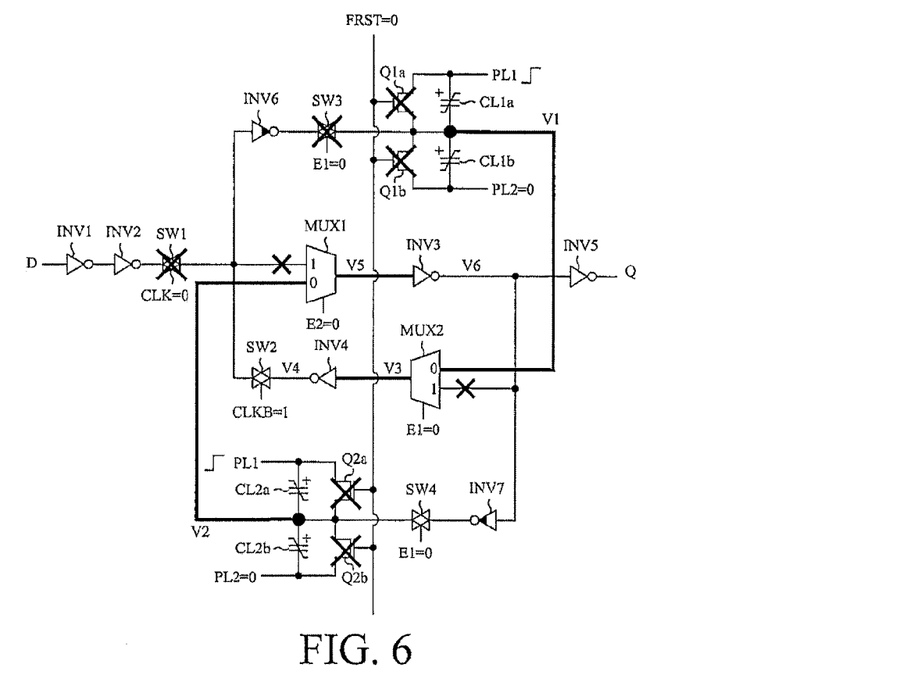
FIG. 6 is a circuit diagram showing a signal path in data read-out operation.

At time point R2, the control signals E1 and E2 are set to "0 (GND)" (that is, in a state in which the data writing drivers are disabled to and the normal loop is disabled in the loop structure portion LOOP); meanwhile, the first and second power voltages VDD1 and VDD2 are applied to the loop structure portion LOOP and the non-volatile storage portion NVM, respectively. At this time, the signal line indicated by the heavy line in FIG. 6 is in a floating state.

Next, at time point R3, the F reset signal FRST is set to "0 (GND)"; meanwhile, the transistors Q1a, Q113, Q2a, and Q2b are turned off. This means that the ferroelectric components CL1a, CL1b, CL2a, and CL2b are in the state of a voltage being applied. On the other hand, the first plate line PL1 is set to "1 (VDD2)" with the second plate line PL2 maintained at "0 (GND)." By applying the pulse voltages in this way, the node voltages V1 and V2 represent the voltage signals corresponding to the remanent polarization states in the ferroelectric components.

Specifically, with reference to the example shown in FIG. 3, the node voltages V1 and V2 represent a comparatively low voltage signal (its logical value will subsequently be referred to as WL [Weak Low]) and a comparatively high voltage signal (its logical value will subsequently be referred to as WH [Weak Hi]), respectively. That means that a voltage difference corresponding to a difference of the remanent polarization states in the ferroelectric components is generated between the node voltages V1 and V2.

From time point R3 to time point R4, the control signal E2 is set to "0 (GND)"; meanwhile, the second input terminals (0) of the multiplexers MUX1 and MUX2 are selected. Thus the logical values of the node voltages V3, V4, V5 and V6 become WL, WH, WH, and WL, respectively. Accordingly, from time point R3 to time point R4, the node voltages V1 to V6 are still unstable (that is, the inverters INV3 and INV4 do not perform a logical inversion completely and thus their output logical values are not changed to "0 (GND)" and "1 (VDD1)," respectively).

Next, at time point R4, the control signal E2 is set to "1 (VDD1)"; meanwhile, the first input terminals (1) of the multiplexers MUX1 and MUX2 are selected. Thus the normal loop is formed in the loop structure portion LOOP. Along with this switching of the signal paths, the output terminal (logical value: WH) of the inverter INV4 and the input terminal (logical value: WH) of the inverter INV3 are connected to each other, and the output terminal (logical value: WL) of the inverter INV3 and the input terminal (logical value: WL) of the inverter INV4 are connected to each other. Thus no mismatch occurs among signal logical values (WH/WL) of each node. When the normal loop is formed in the loop structure portion LOOP, the inverter INV3 receives an input of a logical value WL and thereby raise its output logical value to "1 (VDD1)"; meanwhile, the inverter INV4 receives an input of a logical value WH and thereby lowers its output logical value to "0 (GND)." As a result, the output logical value of the inverter INV3 is securely set to "0 (GND)" instead of the unstable logical value WL; meanwhile, the output logical value of the inverter INV4 is securely set to "1 (VDD1)" instead of the unstable logical value WH.

At time point R4, along with the normal loop being formed in the loop structure portion LOOP, a signal (a voltage difference between the node voltages V1 and V2) reading out from the ferroelectric components is amplified in the loop structure portion LOOP and used as the output signal Q to restore the data ("1 (VDD1)" in the example shown in FIG. 3) kept before turning the power off.

Subsequently, at time point R5, the F reset signal FRST is set to "1 (VDD2)" again, the transistors Q1a, Q1b, Q2a, and Q2b are turned on, and the two terminals of each of the ferroelectric components CL1a, CL1b, CL2a, and CL2b are short circuited. This means that the ferroelectric components CL1a, CL1b, CL2a and CL2b are in the state of no voltage being applied. Meanwhile the first and second plate lines PL1 and PL2 are set to "0 (GND)." Therefore, the non-volatile logic circuit 21 is restored to a normal operation state as the state before time point W1.

FIG. 6 is a circuit diagram showing a signal path (described as a heavy line in the figure) in data read-out operation (particularly from time point R3 to time point R4).

As described above, the non-volatile logic circuit 21 of this embodiment comprises the loop structure portion LOOP that keeps data by is using logic gates (the inverters INV3 and INV4 of FIG. 2) that are connected in a loop; the non-volatile storage portion NVM (CL1a, CL1b, CL2a, CL2b, Q1a, Q1b, Q2a, and Q2b) that stores data kept by the loop structure portion LOOP in a non-volatile manner by means of hysteresis characteristics of the ferroelectric components; and the circuit separation portion SEP (MUX1, MUX2, INV6, INV7, SW3, and SW4) that electrically separates the loop structure portion LOOP and the non-volatile storage portion NVM, wherein the circuit separation portion SEP fixes the voltage applied to the ferroelectric components and enables the loop structure portion LOOP to perform electrical operations during the normal operation of the non-volatile logic circuit 21.

By disposing the data-writing drivers (the inverters INV6 and INV7 of FIG. 2) that may function as buffers between the signal lines of the loop structure portion LOOP and the ferroelectric components CL1a, CL1b, CL2a, and CL2b instead of driving the ferroelectric components CL1a, CL1b, CL2a, and CL2b directly from the signal lines of the loop structure portion LOOP, the ferroelectric components CL1a, CL1b, CL2a, and CL2b can be prevented from becoming load capacitors in the loop structure portion LOOP.

Furthermore, the output terminals of the data writing drivers (the inverters INV6 and INV7) connect with the path switches SW3 and SW4, respectively. According to the control signal E1, the path switches SW3 and SW4 are turned on while only the data writing operation is performed. In this way, the ferroelectric components CL1a, CL1b, CL2a, and CL2b can be prevented from being driven during normal operation.

When a data read-out operation is performed, the electrical connection between the logic gates (the inverters INV3 and INV4 of FIG. 2) in the loop structure portion LOOP and the ferroelectric components CL1a, CL1b, CL2a, and CL2b can be made or broken by switching the input and output paths of the multiplexers MUX1 and MUX2 according to the control signal E2. Therefore, there is no need to provide an additional heavy-load logic line in order to bring specific nodes to a floating state, thereby avoiding increase in power consumption.

Thus the ferroelectric components are prevented from being driven needlessly during normal operation based on the non-volatile logic circuit 21 of this embodiment and thereby achieve an operation speed (data writing speed: µs) of the same level as volatile memory, such as SRAM (Static Random Access Memory).

In FIG. 2, the assembly of the inverters is used as an example of forming the logic gates of the loop structure portion LOOP, including but not limited to the use of other logic gates, such as AND, NAND, OR and NOR.

In the slave apparatus 2, the slave memory capable of storing verification key code in a non-volatile manner uses the non-volatile logic circuit 21 by means of hysteresis characteristics of ferroelectric components; the slave apparatus 2 is different from that of using flash memory or EEPROM. Owing to the slave memory being difficult to copy, non-normalized products with duplicate chips can be prevented from being manufactured and circulated.

According to the verification system of this embodiment, the verification operation between the master apparatus 1 and the slave apparatus 2 is carried out by using a verification algorithm dependent on the characteristics and abilities of the non-volatile logic circuit 21. In other words, this verification algorithm cannot be used in general memory platforms, such as SRAM, flash memory, EEPROM and so on. Using this verification algorithm can discourage manufacture and circulation of non-normalized products with compatible chips since they would render operation other components difficult. The verification algorithm used in the verification system of this embodiment will now be described in detail by way of specific examples.

Figure 7:
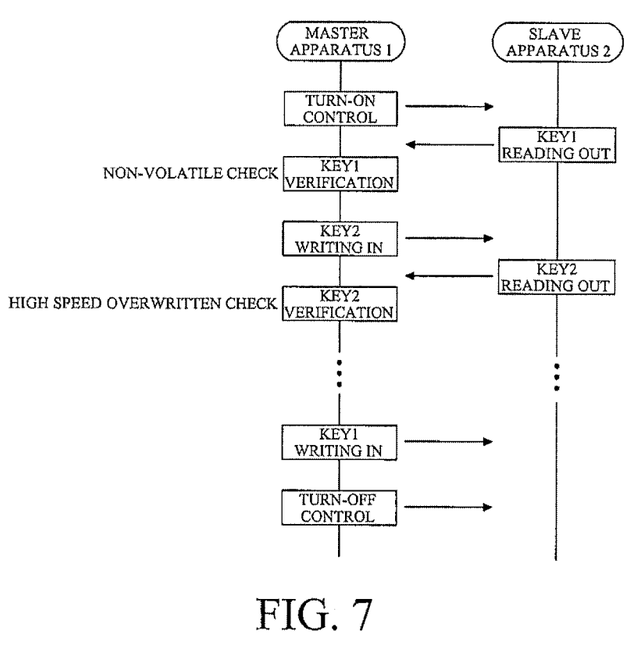
FIG. 7 is a sequence diagram of a first verification algorithm.

FIG. 7 is a sequence diagram of a first verification algorithm. In the verification system using the first verification algorithm, the master apparatus 1 performs a turn-on control for the slave apparatus 2. Then the master apparatus 1 initiates communication with the slave apparatus 2 and confirms whether a first key code KEY1 that is finally decided at previous communication is stored in the slave apparatus 2 (the non-volatile logic circuit 21) in a non-volatile manner. Subsequently, the master apparatus 1 writes a second key code KEY2 different from the first key code KEY1 into the slave apparatus 2; then reads the second key code KEY2 out to perform verification immediately, and thereby confirms whether the data stored in the slave apparatus 2 is to be overwritten at high speed. Afterward the master apparatus 1 initiates normal operation only on condition that the slave apparatus 2 passes the verification and is confirmed as a normalized product; otherwise, the master apparatus 1 initiates counter measures (error reporting or inhibiting normal operation) while the verification is invalid.

In the verification system using the first verification algorithm, the master apparatus 1 writes the first key code KEY1 into the non-volatile memory 11 and the non-volatile logic circuit 21 while an action is finished and reads data out from the non-volatile memory 11 and the non-volatile logic circuit 21 to perform verification while an action is initiated. By performing this verification, it can check whether the slave memory is non-volatile and further find non-normalized products that use volatile memory such as SRAM to be the slave memory out.

In the verification system using the first verification algorithm, the master apparatus 1 writes the second key code KEY2 different from the first key code KEY1 into the non-volatile logic circuit 21 after verifying the first key code KEY1, and then reads data out from the non-volatile logic circuit 21 to perform verification immediately. By performing this verification, it can check whether the slave memory can tolerate being overwritten at high speed and further find non-normalized products that use the low-speed non-volatile memory (data writing speed: ins) such as the flash memory or the EEPROM to be the slave memory out.

Figure 8:
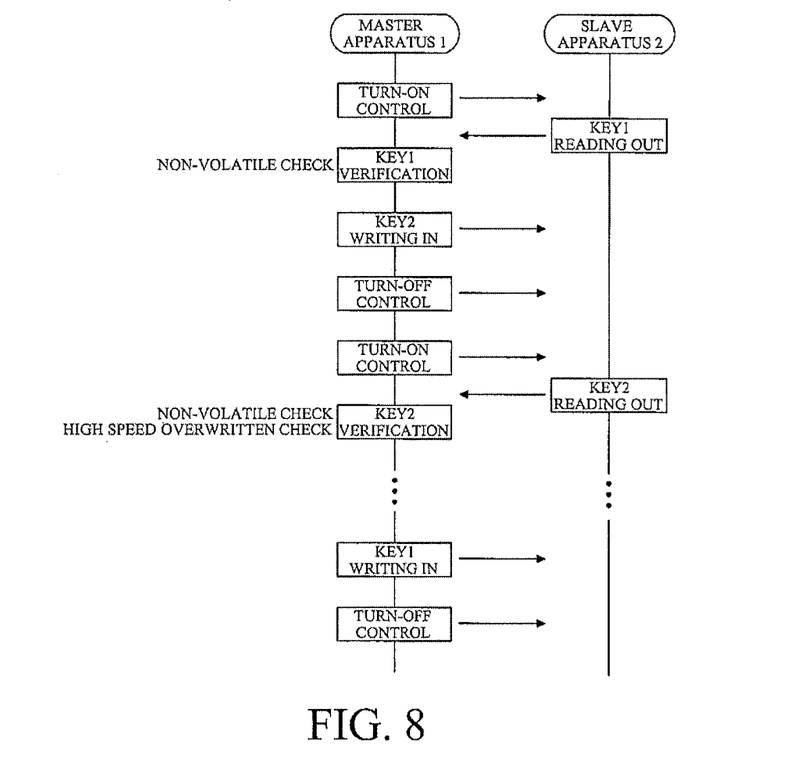
FIG. 8 is a sequence diagram of a second verification algorithm.

FIG. 8 is a sequence diagram of a second verification algorithm. In the verification system using the second verification algorithm, the master apparatus 1 performs a turn-on control for the slave apparatus 2. Then, the master apparatus 1 initiates communication with the slave apparatus 2 and confirms whether a first key code KEY1 that was finally decided during the previous communication is stored in the slave apparatus 2 (the non-volatile logic circuit 21) in a non-volatile manner. Subsequently, the master apparatus 1 writes a second key code KEY2 different from the first key code KEY1 into the slave apparatus 2 to perform turn-off and turn-on control for the slave apparatus 2; then it reads data out from the slave apparatus 2 to perform verification, to confirm whether the data stored in the slave apparatus 2 is non-volatile and can tolerate being overwritten at high speed. Next, the master apparatus 1 initiates normal operation only on condition that the slave apparatus 2 passes the verification and is confirmed as a normalized product; otherwise the master apparatus 1 initiates counter measures (error reporting or inhibiting normal operation) while the verification is invalid.

In the verification system using the second verification algorithm, the master apparatus 1 writes the second key code KEY2 different from the first key code KEY1 into the non-volatile logic circuit 21 and turns the slave apparatus 2 off/on after verifying the first key code KEY1, and then reads data out from the non-volatile logic circuit 21 to perform verification. By performing this verification, it can check whether the slave memory can tolerate being overwritten at high speed. Thus the slave apparatus 2 can be more rigorously verified in comparison with the verification system using the first verification algorithm.

In the verification system using the first verification algorithm, a non-volatile check (verification of first key code KEY1) performed after turning the power on for non-normalized products that use low-speed non-volatile memory (flash memory or EEPROM) as the slave memory and a rapid overwrite check (verification of second key code KEY2) for non-normalized products that use the high-speed volatile memory (SRAM) as the slave memory are insufficient to differentiate the non-volatile logic circuit 21 of normalized products and the slave memory of non-normalized products. In the verification system using the second verification algorithm, by comparison, the data (the first key code KEY2) stored in the volatile memory can be eliminated by turning the power of the slave apparatus 2 off temporarily before verifying the second key code KEY2. Thus it can exactly check whether the non-volatile logic circuit 21 of the normalized product is used as the slave memory.

Figure 9:
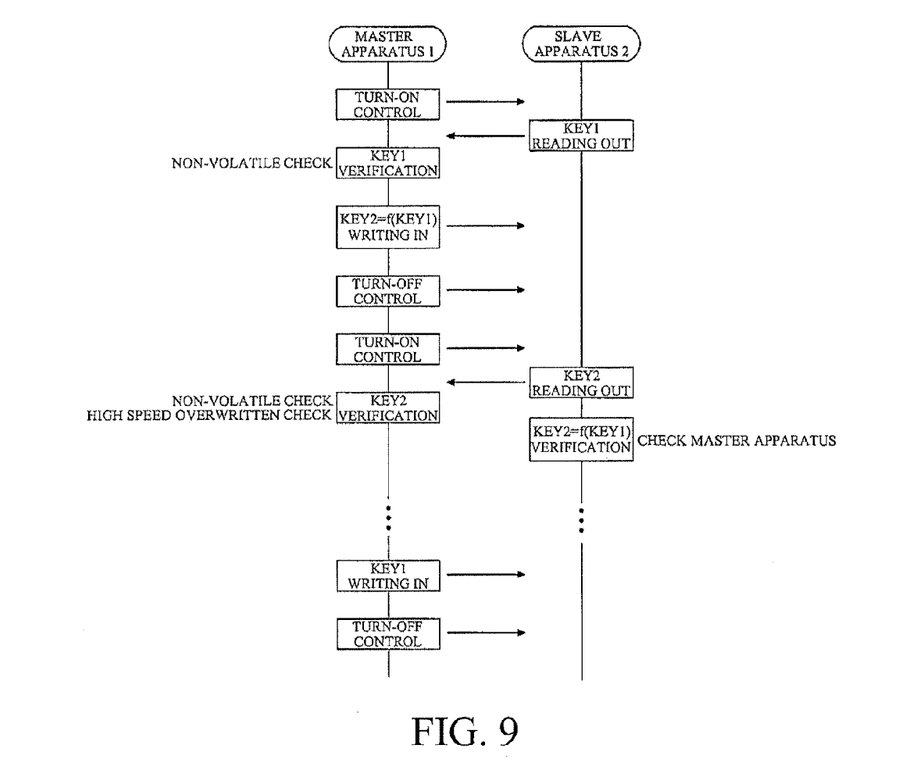
FIG. 9 is a sequence diagram of a third verification algorithm.

FIG. 9 is a sequence diagram of a third verification algorithm. In the verification system using the third verification algorithm, the master apparatus 1 performs a turn-on control for the slave apparatus 2. Then, the master apparatus 1 initiates communication with the slave apparatus 2 and confirms whether a first key code KEY1 that was finally decided during the previous communication is stored in the slave apparatus 2 (the non-volatile logic circuit 21) in a non-volatile manner. Subsequently, the master apparatus 1 writes a second key code KEY2 (wherein the second key code KEY2 is the function of the first key code KEY1) different from the first key code KEY1 into the slave apparatus 2 to perform turn-off and turn-on control for the slave apparatus 2; then it reads data out from the slave apparatus 2 to perform verification, thereby confirm whether the data stored in the slave apparatus 2 is non-volatile and can tolerate being overwritten at high speed. Next, the master apparatus 1 starts normal operation only on condition that the slave apparatus 2 passes the verification and is confirmed as a normalized product; otherwise the master apparatus 1 initiates counter measures (error reporting or inhibiting normal operation) while the verification is invalid. Meanwhile the slave apparatus 2 verifies whether the second key code KEY2 being written into the non-volatile logic circuit 21 is the function of the first key code KEY1 (if KEY2=f(KEY1)). Afterward, the slave apparatus 2 starts normal operation only on condition that the master apparatus 1 passes the verification and is confirmed as a normalized product; otherwise it initiates counter measures (error reporting or inhibiting normal operation) while the verification is invalid.

In the verification system using the third verification algorithm, the master apparatus 1 writes the second key code KEY2 (wherein KEY2=f(KEY1)) generated by a function of the first key code KEY1 into the non-volatile logic circuit 21. Then, the slave apparatus 2 verifies whether the second key code KEY2 being written into the non-volatile logic circuit 21 is the function of the first key code KEY1, By performing this verification, the master apparatus 1 and the slave apparatus 2 can mutually verify each other (bidirectional verification).

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. All such modifications are intended to be within the scope of the claims appended hereto.

Figure 10:
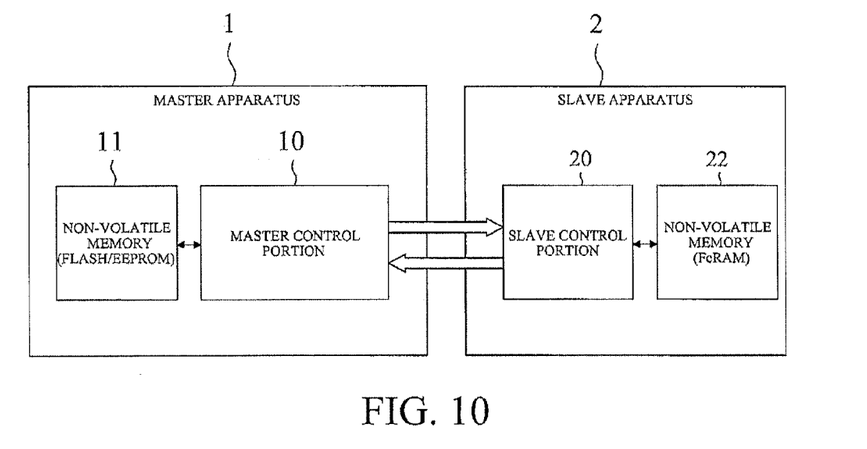
FIG. 10 is a block diagram of a verification system according to another embodiment of the present invention.

For instance, in the slave apparatus 2 according to the above embodiment, the slave memory capable of storing verification key code in the non-volatile manner uses the non-volatile logic circuit 21 contained in a slave control portion 20, including but not limited to, the use of a ferroelectric memory 22 (FeRAM) (referring to FIG. 10) which has the same data writing speed as the non-volatile logic circuit 21 and is difficult to manufacture in comparison with flash memory or EEPROM.

The above embodiments only illustrate that the slave memory is capable of using high-speed non-volatile memory, including but no limited to, the master memory also using high-speed non-volatile memory depending on need.

The above embodiment illustrates that one master apparatus connects with one slave apparatus, including but not limited to, one master apparatus connecting with several slave apparatus.

The present invention can be used to perform unidirectional or bidirectional verification such as between printers and ink cartridges, portable game machines and game boxes, or batteries and battery-powered electronic equipment (handset phone, digital camera, digital video, notebook PC and so on) and thereby prevent non-normalized products from being used improperly.

What is claimed is:

1. A verification system preventing a non-normalized product from being used, the system comprising a master apparatus and a slave apparatus, and performing unidirectional or bidirectional verification between the master apparatus and the slave apparatus, wherein:
    the master apparatus has a master memory capable of storing first key code in a non-volatile manner; and
    the slave apparatus has a slave memory capable of storing first key code in the non-volatile manner, wherein at least the slave memory is one of the group consisting of non-volatile logic circuit and ferroelectric memory, and both of the non-volatile logic circuit and ferroelectric memory use hysteresis characteristics of ferroelectric components, and
    wherein the master apparatus reads data out from the master memory and the slave memory to perform verification while an action is initiated; the master apparatus writes a second key code different from a first key code into the slave memory after verifying the first key code, and then reads data out from the slave memory to perform verification immediately; and the master apparatus determines whether the slave apparatus is a normalized product or a non-normalized product.

2. The verification system as claimed in claim 1, wherein the master apparatus writes the first key code into the master memory and the slave memory while the action is finished.

3. The verification system as claimed in claim 1, wherein the master apparatus writes the second key code generated by a function of the first key code into the slave memory, and the slave apparatus verifies whether the second key code being written into the slave memory is the function of the first key code, and the master apparatus determines whether the slave apparatus is a normalized product or a non-normalized product.

4. The verification system as claimed in claim 1, wherein the master apparatus inhibits a normal operation of the slave apparatus if the slave apparatus is determined as a non-normalized product.

5. The verification system as claimed in claim 1, wherein the non-volatile logic circuit comprises:
    a loop structure portion keeping data by using a plurality of logic gates that are connected in a loop;
    a non-volatile storage portion storing data kept by the loop structure portion in the non-volatile manner by means of hysteresis characteristics of ferroelectric components; and
    a circuit separation portion electrically separating the loop structure portion and the non-volatile storage portion.

6. A verification system preventing a non-normalized product from being used, the system comprising a master apparatus and a slave apparatus, and performing unidirectional or bidirectional verification between the master apparatus and the slave apparatus, wherein:
    the master apparatus has a master memory capable of storing verification first key code in a non-volatile manner; and
    the slave apparatus has a slave memory capable of storing verification first key code in the non-volatile manner, wherein at least the slave memory is one of the group consisting of non-volatile logic circuit and ferroelectric memory, and both of the non-volatile logic circuit and ferroelectric memory use hysteresis characteristics of ferroelectric components, and wherein the master apparatus reads data out from the master memory and the slave memory to perform verification while an action is initiated; the master apparatus writes a second key code different from a first key code into the slave memory after verifying the first key code, and turns the slave apparatus off/on after verifying the first key code, and then reads data out from the slave memory to perform verification; and the master apparatus determines whether the slave apparatus is a normalized product or a non-normalized product.

7. The verification system as claimed in claim 6, wherein the master apparatus writes the first key code into the master memory and the slave memory while the action is finished.

8. The verification system as claimed in claim 6, wherein the master apparatus writes the second key code generated by a function of the first key code into the slave memory, and the slave apparatus verifies whether the second key code being written into the slave memory is the function of the first key code, and determines whether the slave apparatus is a normalized product or a non-normalized product.

9. The verification system as claimed in claim 6, wherein the master apparatus inhibits a normal operation of the slave apparatus if the slave apparatus is determined as a non-normalized product.

10. The verification system as claimed in claim 6, wherein the non-volatile logic circuit comprises:
- a loop structure portion keeping data by using a plurality of logic gates that are connected in a loop;
- a non-volatile storage portion storing data kept by the loop structure portion in the non-volatile manner by means of hysteresis characteristics of ferroelectric components; and
- a circuit separation portion electrically separating the loop structure portion and the non-volatile storage portion.

* * * * *